United States Patent [19]
Hara et al.

[11] Patent Number: 5,419,149
[45] Date of Patent: May 30, 1995

[54] HEAT PUMP TYPE AIR CONDITIONER FOR VEHICLE

[75] Inventors: Junichiro Hara, Yokohama; Takayoshi Matsuoka, Yokosuka, all of Japan

[73] Assignee: Nissan Motor Co., Ltd., Yokohama, Japan

[21] Appl. No.: 116,686

[22] Filed: Sep. 7, 1993

[30] Foreign Application Priority Data

Sep. 14, 1992 [JP] Japan .................................. 4-244956

[51] Int. Cl.⁶ ............................................. F25B 30/00
[52] U.S. Cl. ........................................ 62/160; 62/173; 62/196.4
[58] Field of Search ................ 62/160, 196.4, 324.1, 62/324.6, 173, 90, 244; 165/42

[56] References Cited

U.S. PATENT DOCUMENTS

| | | | |
|---|---|---|---|
| 3,402,564 | 9/1968 | Nussbaum | 62/173 |
| 3,421,339 | 1/1969 | Volk et al. | 62/173 X |
| 3,738,117 | 6/1973 | Engel | 62/173 |
| 3,798,920 | 3/1974 | Morgan | 62/173 |

FOREIGN PATENT DOCUMENTS

| | | | |
|---|---|---|---|
| 2700634 | 7/1978 | Germany | 62/90 |
| 63-103727 | 5/1988 | Japan | 62/90 |
| 2-130808 | 10/1990 | Japan . | |
| 2-290475 | 11/1990 | Japan . | |

OTHER PUBLICATIONS

Ishiwatari, Kenji, *Shinpen Reitou Kuuchou Jitsumu Dokuhon* (*New Edition Refrigeration and Air-Conditioning Practical Book*, p. 134, Ohm Publishing Company (1986).

*Primary Examiner*—Harry B. Tanner
*Attorney, Agent, or Firm*—Foley & Lardner

[57] ABSTRACT

A heat pump type air conditioner for a vehicle has a compressor to which a condenser and a inner heat exchanger are connected through a first switching valve. The condenser is connected at its refrigerant outlet to the inner heat exchanger through a second switching valve. An refrigerant outlet of the inner heat exchanger is connected to an evaporator through an expansion valve. A refrigerant outlet of the evaporator is connected to the compressor. The first switching valve functions to change the operation or the air conditioner between heating and cooling. The first and second switching valves function to allow to flow the refrigerant into the outer heat exchanger even if in heating, according to the thermal condition of the outer heat exchanger. Therefore, it becomes possible to stably implement heating without causing a stagnation of the refrigerant in the outer condenser even under a cold thermal condition.

14 Claims, 11 Drawing Sheets

HEAT PUMP TYPE AIR CONDITIONER FOR VEHICLE

BACKGROUND OF THE INVENTION

1. Field of the Invention

The present invention relates to improvements in a heat pump type air conditioner applied to a vehicle.

2. Description of the Related Art

Japanese Patent Provisional Publication No. 2-290475 and Japanese Utility Model Provisional Publication No. 2-130808 disclose typical heat pump type air conditioner for an automotive vehicles. Such an air conditioner is provided with a four-way valve for changing refrigerant flow between a heating operation and a cooling operation. Accordingly, during the heating operation an outer heat exchanger is used as a heat absorber, and an inner heat exchanger is used as a heat radiator. On the other hand, during the cooling operation the outer heat exchanger is used as a heat radiator, and the inner heat exchanger is used as a heat absorber.

FIG. 10 shows the heat pump type air conditioner disclosed in Japanese Patent Provisional Publication No. 2-290475. In this heat pump type air conditioner, during a heating operation, a four-way valve 2 is set as indicated by a continuous line in FIG. 10, and refrigerant is circulated as follows: A compressor 1→ the four-way valve 2→ a first inner heat exchanger 3→ a heating heat exchanger 4→ a second inner heat exchanger 5→an expansion valve 6→ an outer heat exchanger 7→ the four-way valve 2→ a receiver 8→ the compressor 1. Accordingly, the heat of the refrigerant is transmitted to air led by a blower fan 9 and is used for heating a passenger compartment. The heat from an engine 10 is transmitted to the refrigerant through the heating heat exchanger 4 and further transmitted from the refrigerant to air led by a blower fan 11 for heating the passenger compartment. The heat of the air led by a fan 12 is transmitted to the refrigerant through the outer heat exchanger 7.

On the other hand, during the cooling operation, the four-way valve 2 is set as indicated by a dashed line in FIG. 10 and refrigerant is circulated as follows: The compressor 1→ the outer heat exchanger 7→ the expansion valve 6→ the second inner heat exchanger 5→ the first inner heat exchanger 3→ the four-way valve 2→ the receiver 8→ the compressor 1. Accordingly, the heat of the refrigerant discharged from the compressor 1 is radiated into the atmosphere by the outer heat exchanger 7. The heat of air led by the blower fans 9 and 11 is transmitted into the refrigerant by the first and second inner heat exchanger 3 and 5. The cooled air is supplied to the passenger compartment.

With such a conventional air conditioner, the absorbed heat amount by the outer heat exchanger 7 is decreased during the heating operation under a condition such that the ambient temperature is low, the automotive vehicle is in running, or it is raining or snowing. Furthermore, if the workload of the compressor 1 is constant, the radiated heat amount from the first and second inner heat exchangers 3 and 5, which is the sum of the heat absorbing amount from the outer heat exchanger 7 and the workload of the compressor 1, is decreased, and the heating capacity of the air conditioner is lowered. Additionally, the lowering of the heating capacity invites the frost to the heat exchanger. This increases a defrost operation and prevents a stable heating operation. Furthermore, since the conventional air conditioner is arranged such that the flow direction of the refrigerant is changed under the cooling and heating operations, it is necessary to change the design of the conduits of the outer and inner heat exchangers 7, 3 and 5 so as to be durable to high temperature and high pressure.

Also, since the conventional air conditioner is arranged to generate heated air for heating by utilizing the waste heat of the engine 10 during the heating operation, this air conditioner can not sufficiently operate if applied to a vehicle which only has small heat source, such as to a solar car or electric vehicle.

Furthermore, since the conventional air conditioner is arranged to select one of the cooling and heating operations on the basis of the difference between a target outlet air temperature and an inlet air temperature to the inner heat exchangers 3 and 5 and can not simultaneously carry out both cooling and heating operations, a dehumidifying heating operation can not be implemented by the conventional air conditioner.

In contrast, another heat pump type air conditioner has been proposed in the U.S. patent application Ser. No. 07/995,096, filed Dec. 22, 1992. The heat pump type air conditioner for a vehicle is arranged as shown in FIG. 11. With this air conditioner, it becomes possible to stably implement air-conditioning operation and to improve air-conditioning performance without being effected by a weather condition. In addition, it becomes possible to implement dehumidifying heating operation. During a heating operation by this air conditioner, a three-way valve 132 is switched as indicated by a continuous line arrow, and therefore the refrigerant is circulated in the air conditioner as follows: A compressor 131→ the three-way valve 132→ a heat-radiating inner heat exchanger 133→ a receiver 136→ an expansion valve 134→ a heat-absorbing inner heat exchanger 135→ the compressor 131. Therefore, air led by a fan blower is cooled and dehumidified by the heat absorbing-inner heat exchanger 135 and then heated by the heat-radiating inner heat exchanger 133 in order to supply conditioned-air for heating into a passenger compartment. On the other hand, during a cooling operation, the three-way valve 132 is switched as indicated by a dashed line arrow, and the refrigerant is circulated in the air conditioner as follows: The compressor 131→ the three-way valve 132→ an outer heat exchanger 138→ a one-way valve 170→ the heat-radiating inner heat exchanger 133→ the receiver 136→ the expansion valve 134→ the heat-absorbing inner heat exchanger 135→ the compressor 131. Accordingly, the outer heat exchanger 138 discharges heat of the refrigerant into the atmosphere, and the air led by the fan blower is cooled by the heat-absorbing inner heat exchanger 135 so as to supply conditioned-air for cooling into the passenger compartment.

With this air conditioner, during heating operation, the three-way valve 132 is switched as shown by the continuous line arrow so as to prevent the refrigerant from flowing into the outer heat exchanger 138 by means of the three-way valve 132 and the one-way valve 170. However, when the automotive vehicle equipped with such air conditioner is put in a cold district in winter, the outer heat exchanger 138 is largely chilled and therefore the refrigerant in the outer heat exchanger 138 changes its condition from a gas phase into a two-phase or liquid phase. Accordingly, the inner pressure of the outer heat exchanger 138 is decreased due to the increase of the density of the refrigerant. In almost all cases during the heating operation, the refrigerant in the system flows so as not to enter the outer heat exchanger 138 by means of the three-way valve 132 and the one-way valve 170. However, it may happen that the refrigerant is gradually flowed into the outer heat exchanger 138 according to the lowering of the inner pressure through a clearance of the three-way valve 132 or the one-way valve 170 which is formed by some reasons. If stagnation of refrigerant is generated in the outer heat exchanger 138 due to the entering of the refrigerant, the lack of refrigerant in the heat-pump cycle is caused and therefore the air conditioner is prevented from stably implementing the heating operation. Further, although it is possible to put the outer heat exchanger 138 into an unventilated condition by closing an air inlet of the outer heat exchanger 138 or to enlarge the volume of the receiver 136, such modulations tend to increase weight and production cost thereof.

SUMMARY OF THE INVENTION

It is an object of the present invention to provide a heat pump type air conditioner which enables a stable heating operation to be implemented even if the temperature of the ambient air is largely lowered.

A heat pump type air conditioner according to the present invention is for a vehicle and comprises a compressor which applies a workload to refrigerant. A condenser is connected to a refrigerant discharge side of the compressor and radiates heat of the refrigerant into ambient air. A blower leads air for air-conditioning the passenger compartment of the vehicle. An inner heat exchanger is connected to the refrigerant discharge side of the compressor and transmits the heat of said refrigerant to the air led by the blower. An expansion valve is connected to a refrigerant outlet side of the inner heat exchanger. An evaporator is connected to a refrigerant outlet side of the expansion valve. The evaporator cools the air led by the blower by transmitting the heat of the air to the refrigerant which is supplied through the expansion valve from at least one of the condenser and the inner heat exchanger. A refrigerant passage changing device connects the compressor with the condenser and the inner heat exchanger. The refrigerant passage changing device is set in one of a cooling operation in that the compressor is fluidly communicated with the condenser and a heating operation in that the compressor is fluidly communicated with the inner heat exchanger. A switching device is connected to at least one of the refrigerant inlet and outlet of said condenser and controls the flow of the refrigerant toward the condenser when the refrigerant passage changing device is set in the heating operation.

With this arrangement, it becomes possible to maintain the inner pressure of the condenser by easily switching the flow of the refrigerant in the condenser by means of the switching means even if the system is in a condition that the flow into the condenser is forbidden.

BRIEF DESCRIPTION OF THE DRAWINGS

In the drawings, like reference numerals designate like parts and like elements throughout all figures, in which.

DETAILED DESCRIPTION OF THE INVENTION

Referring to FIGS. 1 to 6, there is shown a first embodiment of a heat pump type air conditioner for a vehicle according to the present invention.

Figure 1:
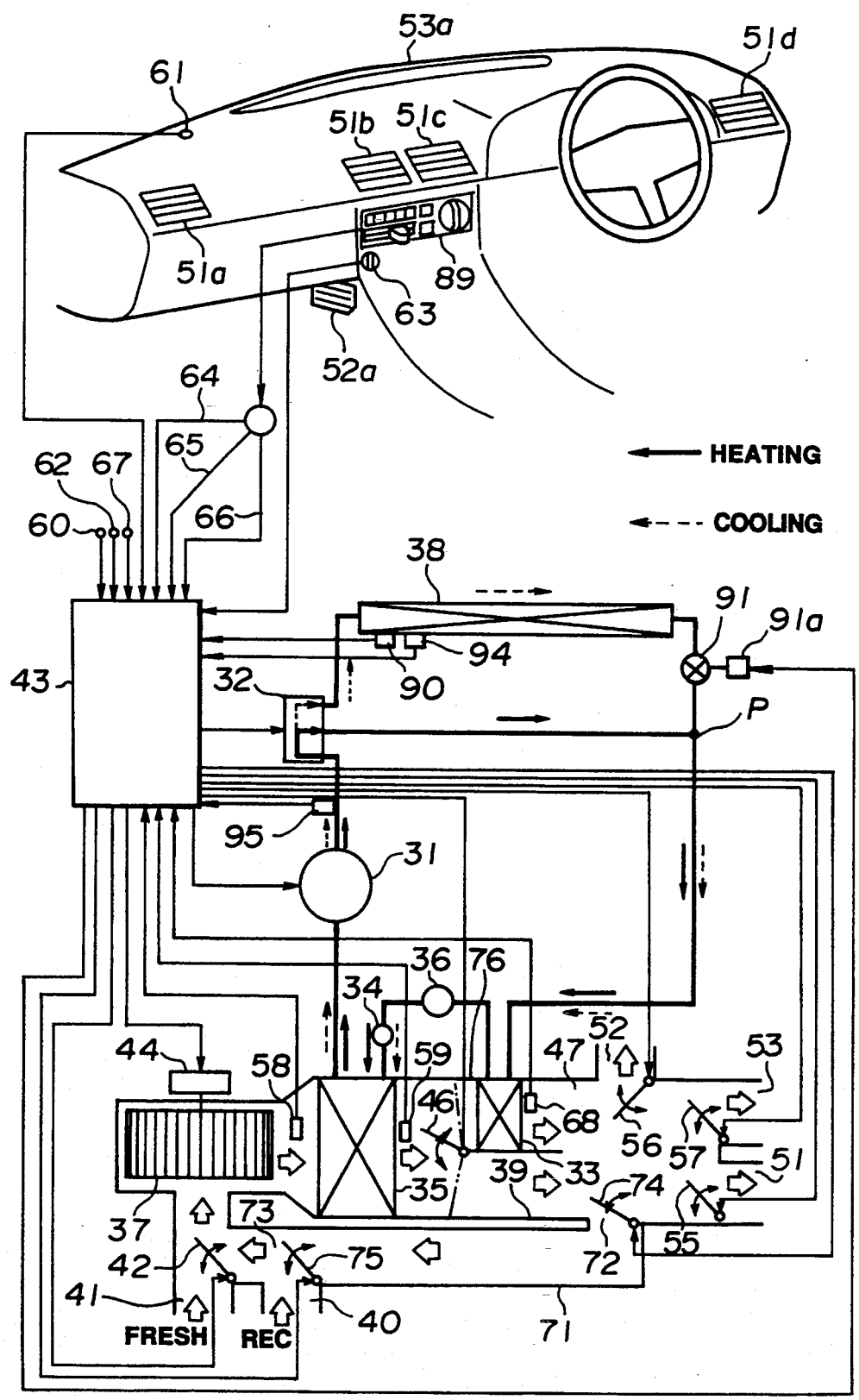
FIG. 1 is a schematic view showing a whole structure of a first embodiment of a heat pump type air conditioner according to the present invention.
Figure 2:
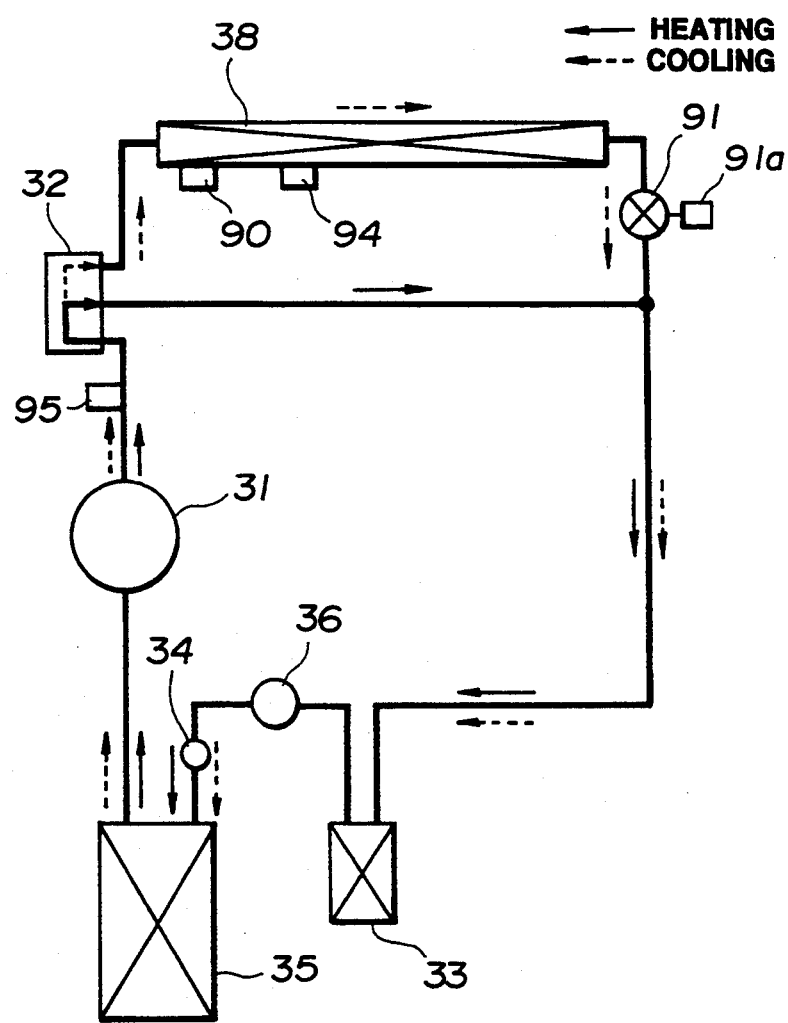
FIG. 2 is a conceptual view for selecting a switching between cooling and heating operations applied to the first embodiment of FIG. 1.

As shown in FIGS. 1 and 2, a compressor 31 is disposed outside of a passenger compartment of the vehicle, such as in an engine room. The compressor 31 is of a type in which input power is directly variable, such as of an electric drive type or hydraulic drive type. An outer heat exchanger (or outer condenser) 38 and a heat-radiating inner heat exchanger (or inner condenser) 33 are connected to a discharge side of the compressor 31 through a three-way valve 32 functioning as a refrigerant switching means. A pressure sensor 95 for detecting a discharge pressure of the compressor 31 is connected to a conduit between the compressor 31 and the three-way valve 32 and outputs a signal indicative of the discharge pressure of the compressor 31 to a control unit 43. The outer heat exchanger 38 is disposed outside of the passenger compartment and serves as an outer condenser for radiating heat of refrigerant which heat is discharged from the compressor 31 into the atmosphere.

The heat-radiating inner heat exchanger 33 is disposed in a duct 39. The duct 39 is located at a front portion of the passenger compartment such as a back side of an instrument panel and serves as a main body of the air conditioner. The heat-radiating inner heat exchanger 33 serves as an inner condenser of a radiating type by which heat of the refrigerant discharged from the compressor 31 is radiated into air led by a blower fan 37 functioning as a blowing means.

The three-way valve 32 during a heating operation is set at a state shown by a continuous line arrow in FIG. 1 and fluidly communicates the discharge side of the compressor 31 and a refrigerant inlet of the heat-radiating inner heat exchanger 33. On the other hand, the three-way valve 32 during a cooling operation is set at a state shown by a dashed line arrow in FIG. 1 and fluidly communicates the discharge side of the compressor 31 with the refrigerant inlet of the outer heat exchanger 38. The refrigerant outlet of the outer heat exchanger 38 is connected to the refrigerant inlet of the heat-radiating inner heat exchanger 33 through an outlet-side switching valve 91.

The outlet-side switching valve 91 is of a characterized art in the first embodiment of the present invention. The outlet-side switching valve 91 is disposed between the refrigerant outlet of the outer heat exchanger 38 and a connecting point P where the refrigerant outlet of the three-way valve 32, the refrigerant outlet of the outer heat exchanger 38 and the refrigerant inlet of the heat-radiating inner heat exchanger 33 are connected. An electromagnetic actuator 91a is arranged to operate the open and close control of the outlet-side switching valve 91 and connected to a control unit 43 which controls the electromagnetic actuator 91a. By opening the outlet-side switching valve 91, a part of the refrigerant, which should flow from the compressor 31 to the heat-radiating inner heat exchanger 33, is fed into the outer heat exchanger 38 through the outlet-side switching valve 91 in the event that the temperature of the outer heat exchanger 38 is lowered and the pressure of the outer heat exchanger 38 is thereby lowered. On the other hand, by closing the outlet-side switching valve 91, the feeding of the refrigerant from the compressor 31 to the outer heat exchanger 38 through the outlet-side switching valve 91 is stopped.

That is, the outlet-side switching valve 91 constitutes a switching means which allows and stops the flow of the refrigerant into the outer heat exchanger 38. In particular, during the heating operation, the flow control of the refrigerant to the outer heat exchanger 38 by the outlet-side switching valve 91 is implemented according to the thermal information of the outer heat exchanger 38. That is, when the temperature and the pressure in the outer heat exchanger 38 is lowered, the flow of the refrigerant into the outer heat exchanger 38 is started and continued until the inner pressure of the outer heat exchanger 38 becomes a predetermined pressure. Accordingly, an outer heat exchanger temperature sensor 90 is disposed at the outer heat exchanger 38 as a detecting means for detecting the factor of the thermal information of the outer heat exchanger 38 and outputs a signal indicative of the detected factor to the control unit 43. Further, a pressure sensor 94 is connected to the outer heat exchanger 38 in order to detect an inner pressure of the outer heat exchanger 38 and outputs a signal indicative of the inner pressure of the outer heat exchanger 38 to the control unit 43.

The refrigerant outlet of the heat-radiating inner heat exchanger 33 is connected to a refrigerant inlet of a heat-absorbing inner heat exchanger (or evaporator) 35 through a receiver 36 and an expansion valve 34. The expansion valve 34 is disposed outside of the passenger compartment and serves as an expansion means for atomizing a liquid refrigerant by the adiabatic expansion. The heat-absorbing inner heat exchanger 35 is disposed at an upstream side of the heat-radiating inner heat exchanger 33 in the duct 39. The heat-absorbing inner heat exchanger 35 serves as an evaporator of an endothermic type by which the heat of the air led by the blower fan 37 is absorbed into the refrigerant supplied from at least one of the outer heat exchanger 38 and the heat-radiating inner heat exchanger 33 through the expansion valve 34. The refrigerant outlet of the heat-absorbing inner heat exchanger 35 is connected to a suction side of the compressor 31.

An auxiliary heater 76 is disposed at an air inlet side of the heat-radiating inner heat exchanger 33. The auxiliary heater 76 is an electric heater which is able to variably change the output by the change of the input voltage controlled by the control unit 43. Turning on the auxiliary heater 76, the air passing through the heat-radiating inner heat exchanger 33 is heated and therefore the temperature of the refrigerant flowing through the heat-radiating inner heat exchanger 33 is raised.

In the duct 39, an inner air inlet 40 for leading the air from the passenger compartment to the duct 39 and an outer air inlet 41 for leading outside air due to the wind pressure caused by the running of the vehicle are disposed upstream of the heat-absorbing inner heat exchanger 35. An intake door 42 for properly mixing the air from the inner air inlet 40 and the outer air inlet 41 is disposed at a dividing portion of the inner and outer air inlets 40 and 41 in the duct 39. The blower fan 37 is rotated by a blow fan motor 44 controlled by a control unit 43 and disposed downstream of the inner and outer air inlets 40 and 41 and upstream of the heat-absorbing inner heat exchanger 35 in the duct 39.

An air mixing door 46 is disposed upstream of the heat-radiating inner heat exchanger 33 in the duct 39. The air mixing door 46 is driven by an actuator (not shown) controlled by the control unit 43 so as to change the rate of the amounts of cool air and hot air, wherein the cool air is the air which bypasses the heat-radiating inner heat exchanger 33 and the hot air is the air which passes through the heat-radiating inner heat exchanger 33. An opening degree $X_{dsc}$ of the air mixing door 46 is defined as follows: When the air mixing door 46 is located at a position indicated by a long and short dash line in FIG. 1 and the rate of the cool air is 100%, the opening degree $X_{dsc}$ is defined as 0% (full close condition). When the air mixing door 46 is located at a position indicated by a long and two short dashes line in FIG. 1 and the rate of the hot air is 100%, the opening degree $X_{dsc}$ is defined as 100% (full open condition).

In order to further improve the mixing of cool air and hot air, an air mixing chamber 47 is disposed downstream of the heat-radiating inner heat exchanger 33 in the duct 39. The air mixing chamber 47 has a ventilator outlet 51 (51a, 51b, 51c and 51d) for feeding the conditioned-air toward an upper side of a vehicle passenger (not shown), a foot outlet 52 (52a) for feeding the conditioned-air toward a foot portion of the vehicle passenger, and a defroster outlet 53 (53a) for feeding the conditioned-air toward a front glass (not shown). A ventilator door 55, a foot door 56, and a defroster door 57 are disposed in the air mixing chamber 47. The ventilator door 55 is arranged to open and close the ventilator outlet 51 owing to a ventilator door actuator (not shown) controlled by the control unit 43. The foot door 56 is arranged to open and close the foot outlet 52 owing to the foot door actuator (not shown) controlled by the control unit 43. The defroster door 57 is arranged to open and close the defroster outlet 53 owing to a defroster door actuator (not shown) controlled by the control unit 43.

A circulation passage 71 is disposed so as to communicate the air mixing chamber 47 and the inner air inlet 40. An inlet door 74 is disposed at an opening 72 of the circulation passage 71 which opening is formed in the vicinity of the air mixing chamber 47 in the duct 39. An outlet door 75 is disposed at a branch portion 73 between the circulation passage 71 and the inner air inlet 40. The inlet door 74 is arranged to open and close the opening 72 by means of an inlet door actuator (not shown) which is driven according to a signal frown the control unit 43. The outlet door 75 is arranged to change a communicating condition of the branch portion 73 by means of an outlet door actuator (not shown) which is driven according to a signal from the control unit 43. That is, the conditioned-air is circulated from the air mixing chamber 47 to an upstream side of the blower fan 37 when the inlet door 74 and the outlet door 75 are opened wherein the outlet door 75 is positioned to close the inner air inlet 40.

The control unit 43 is connected to thermal information input means, such as an inlet air temperature sensor 58 for the heat-absorbing inner heat exchanger 35, an outlet air temperature sensor 59 for the heat-absorbing inner heat exchanger 35, a blowout air temperature sensor 60 of the ventilator outlet 51, a solar radiation sensor 61, an outer air (ambient) temperature sensor 62, a room air temperature sensor 63, an inner temperature setting device 64 installed in an air conditioner control panel 89, a blowout outlet mode switch 65, a blower fan switch 66, a refrigerant temperature sensor 67, and an outlet air temperature sensor 68 of the heat-radiating inner heat exchanger 33.

The inlet air temperature sensor 58 detects an inlet air temperature $T_{suc}$ and sends it to the control unit 43. The outlet air temperature sensor 59 detects an outlet air temperature $T_{out}$ and sends it to the control unit 43. The blowout air temperature sensor 60 detects a ventilator blowout air temperature $T_{vent}$ and sends it to the control unit 43. The solar radiation sensor 61 detects a solar radiation amount $Q_{sun}$ to the vehicle and sends it to the control unit 43. The outer air temperature sensor 62 detects an outer air temperature $T_{amb}$ and sends it to the control unit 43. The room air temperature sensor 63 detects a room air temperature $T_{room}$ and sends it to the control unit 43. A preset room temperature $T_{ptc}$ is inputted from the room temperature setting device 64 by a vehicle passenger and is sent to the control unit 43. The outlet air temperature sensor 67 detects a blowout air temperature $T_v$ and sends it to the control unit 43. The control unit 43 calculates target air-conditioning factors such as the air mixing door opening degree $X_{dsc}$, an input value $W_{comp}$ of the compressor 31, an air flow rate $V_{eva}$ passing through the heat-absorbing inner heat exchanger 35, and a target conditioned air temperature $T_{of}$, according to the above-mentioned thermal information. Furthermore, on the basis of the calculated values, the control unit 43 controls the compressor 31, the blower fan motor 44, the air-mixing door actuator, the return door actuator, the ventilator door actuator, the foot door actuator, and the defroster door actuator so as to keep the target air-conditioning factors to the calculated value.

Figure 3:
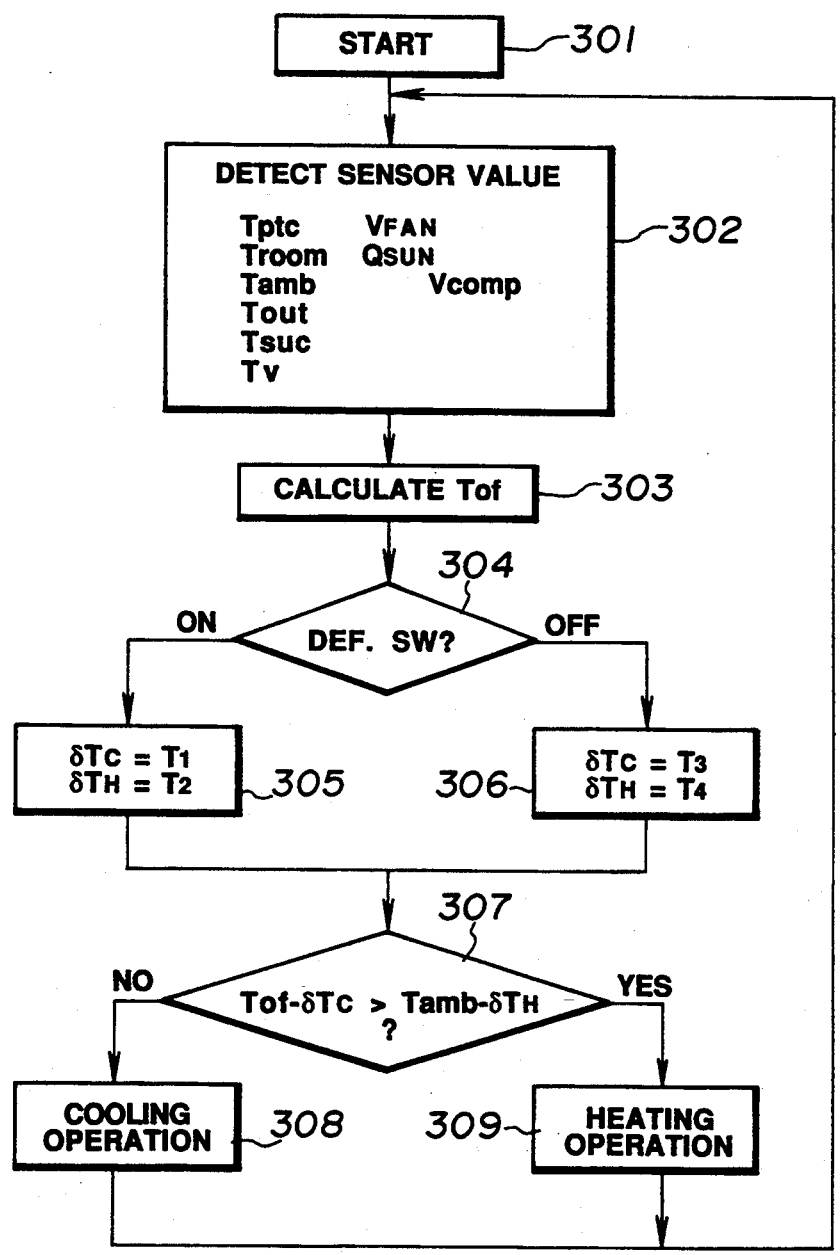
FIG. 3 is a flow chart for selecting one of the cooling and heating operations of the first embodiment.
Figure 4:
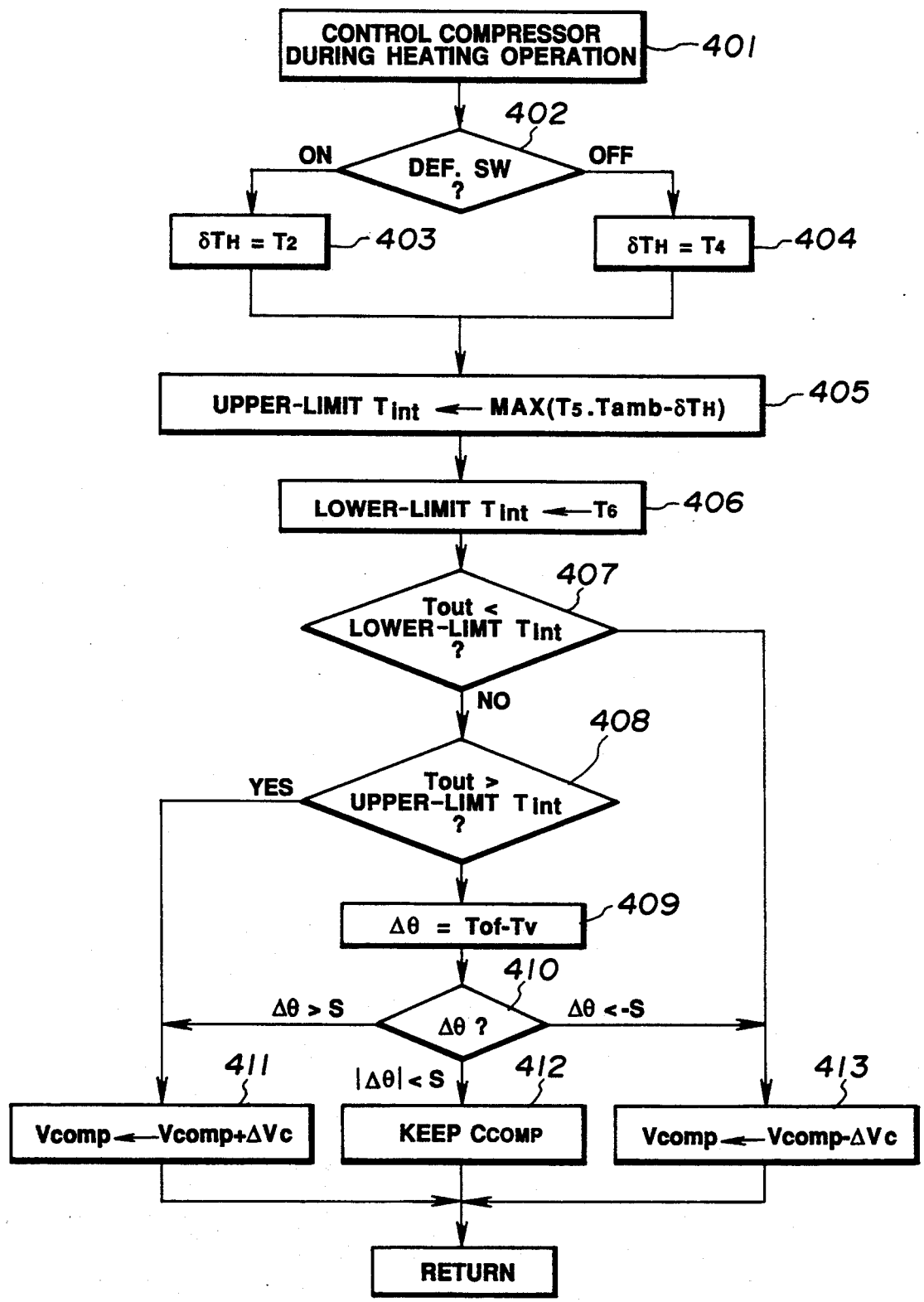
FIG. 4 is a flow chart for controlling a compressor of the first embodiment of FIG. 1 during the heating operation.
Figure 5:
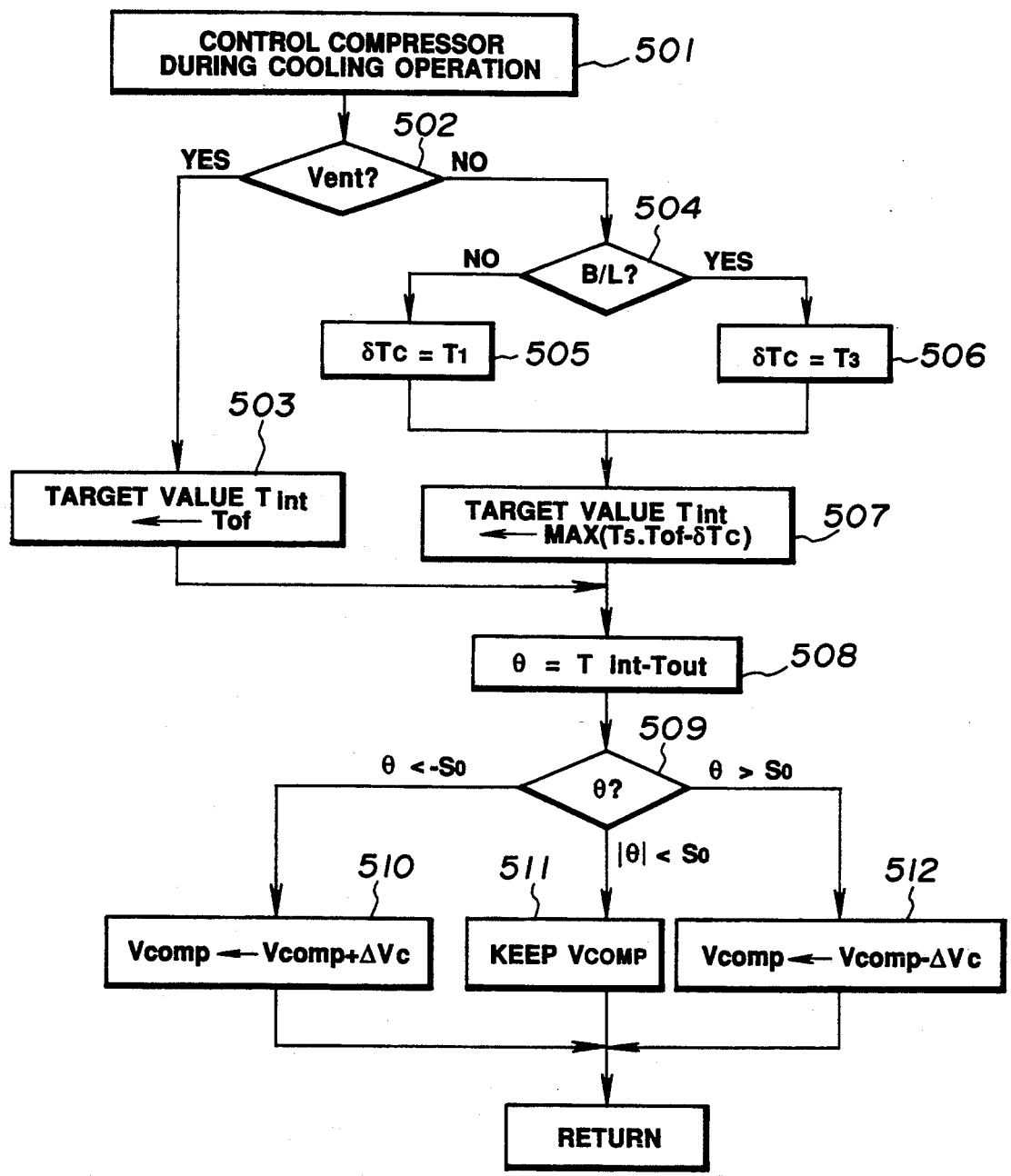
FIG. 5 is a flow chart for controlling the compressor of the first embodiment of FIG. 1 during the cooling operation.
Figure 6:
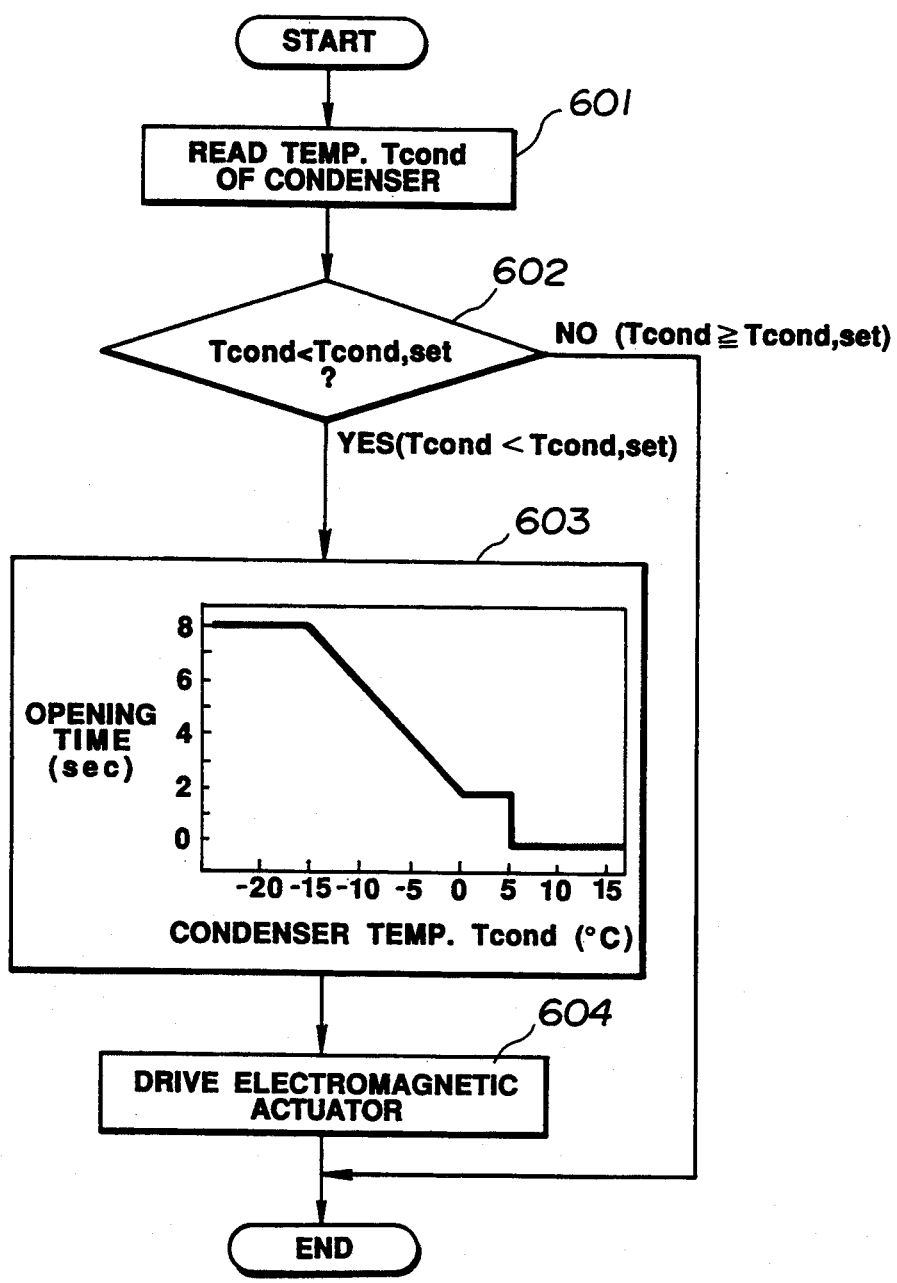
FIG. 6 is a flow chart for interruption routine for determining an opening time of a switch valve in the heat pump type air conditioner of the first embodiment.

The heat pump type air conditioner of the first embodiment is mainly controlled on the basis of flow charts shown in FIGS. 3 to 5. Further, since an interruption routine shown by a flow chart in FIG. 6 is implemented relative to the main control, even if the air conditioner is put into a largely cold condition in a cold district, the pressure in the outer heat exchanger 38 is maintained at a predetermined value during the heating operation.

FIG. 3 shows a flow chart which indicates a process for selecting one of the cooling operation and the heating operation. The program shown in FIG. 3 starts in reply to the turning-on of the control unit 43 due to the turning-on of the main switch of the air conditioner, as a step 301.

In a step 302, the respective sensors output the respective outputs to the control unit 43. That is, a compartment temperature preset device 64 outputs a signal indicative of the preset compartment temperature $T_{ptc}$. A compartment temperature sensor 63 outputs a signal indicative of a compartment temperature $T_{room}$. The ambient temperature sensor 59 outputs a signal indicative of the ambient air temperature $T_{amb}$. The air temperature sensor 59 outputs a signal indicative of an outlet air temperature $T_{out}$ of the heat-absorbing inner heat exchanger 35. The air temperature sensor 58 outputs a signal indicative of a suction air temperature $T_{suc}$ of the heat-absorbing inner heat exchanger 35. The air temperature sensor 67 outputs a signal indicative of an outlet air temperature $T_v$ of the heat-radiating inner heat exchanger 33. The voltage $V_{fan}$ applied to the fan motor 44 is outputted to the control unit 43. The solar sensor 61 outputs a signal indicative of a solar radiation amount $Q_{sun}$. A physical amount $V_{comp}$ indicative of the workload of the compressor 31 is outputted to the control unit 43. The discharge amount from the compressor 31 is increased in proportion to the increase of the physical amount $V_{comp}$, and the workload of the compressor 31 is similarly increased. If an electric compressor is applied to the compressor 31, the physical amount $V_{comp}$ corresponds to frequency.

In a step 303, a target conditioned-air temperature $T_{of}$ is calculated on the basis of heat-load information which is of the thermal information detected in the step 302.

In a step 304, it is judged whether the defroster switch is turned on or not. When the defroster switch is turned on, the program proceeds to a step 305. When the defroster switch is turned off, the program proceeds to a step 306.

In the step 305, correction terms under the defroster switch turned-on condition are determined relative to a target cooling condition of the heat-absorbing inner heat exchanger 35. That is, relative to the target value $T_{of}$ of the outlet air temperature of the heat-absorbing inner heat exchanger 35 under the cooling operation, a correction term $\delta T_C$ is determined at $T_1$. Further, relative to the upper-limit cooling temperature (window-fining temperature $T_{fine}$) under the heating operation, a correction term $\delta T_H$ is determined at $T_2$. In case that the defroster switch is turned on, the amount of dehumidification is increased by setting the target cooling temperature to be lower than a normal value, and the amount of the heating by the heat-radiating inner heat exchanger 33 is increased. Therefore, the temperature of the outlet conditioned-air to the compartment is adjusted to a target temperature.

Similarly, in the step 306, the correction terms $\delta T_C$ and $\delta T_H$ under the defroster switch turned-off condition are determined relative to the target cooling condition of the heat-absorbing inner heat exchanger 35, that is, the correction term $\delta T_C$ is determined at $T_3$ and the correction term $\delta T_H$ is determined at $T_4$.

In a step 307, taking the correction terms $\delta T_C$ and $\delta T_H$ determined in the step 305 or step 306 into consideration, the cooling conditions at the heat-absorbing inner heat exchanger 35 under the cooling operation and the heating operation are compared. When the cooling condition under the cooling operation becomes lower than or equal to the cooling condition under the heating operation ($T_{of} - \delta T_C \leq T_{amb} - \delta T_H$), that is, when the judgment in the step 307 is "NO", the program proceeds to a step 308 wherein the cooling operation is implemented. When the cooling condition under the heating condition is higher than the cooling condition under the cooling condition ($T_{of} - \delta T_C \leq T_{amb} - \delta T_H$), that is, when the judgment in the step 307 is "YES", the program proceeds to a step 309 wherein the heating operation is implemented.

FIG. 4 shows a flow chart for a control of the compressor 31 during the heating operation.

In a step 401, the heating operation is started. Following this, in a step 402, it is judged whether the defroster switch is turned on or not. When the defroster switch is turned on, the program proceeds to a step 403 wherein the correction term $\delta T_H$ is determined at $T_2$. When the defroster switch is turned off, the program proceeds to a step 404 wherein the correction term $\delta T_H$ is determined at $T_4$.

In a step 405, the preset upper-limit cooling temperature $T_5$ at a low ambient temperature and the upper-limit cooling temperature $T_{fine}$ on the basis of the ambient air temperature $T_{amb}$ are compared, and larger one of them is determined as the upper-limit cooling temperature (upper-limit $T_{int}$) under the heating operation. Although the ambient temperature is used as a representative one of elements for determining the upper-limit cooling temperature in this embodiment, it will be understood that the thermal circumstantial condition of the vehicle or the output of the window-clouding sensor may be used as an element for determining the upper-limit cooling temperature.

In a step 406, the temperature $T_{seto}$ ($T_6$) on the basis of the freezing of the heat-absorbing inner heat exchanger 35 is determined as the lower-limit cooling temperature (lower-limit $T_{int}$).

In a step 407, it is judged whether or not the outlet air temperature $T_{out}$ of the heat-absorbing inner heat exchanger 35 is lower than the lower-limit cooling temperature (the lower-limit $T_{int}$). When $T_{out}$ < lower-limit $T_{int}$, the program proceeds to a step 413 wherein the workload of the compressor 31 is reduced by $\Delta V_C$ so as to raise the outlet air temperature of the heat-absorbing inner heat exchanger 35 and to adjust the temperature within the range between the upper-limit cooling temperature and the lower-limit cooling temperature, in order to avoid the freezing of the heat-absorbing inner heat exchanger 35. During this operation, a control for raising the inlet air temperature of the heat-absorbing inner heat exchanger 35 is implemented so as to prevent the outlet air temperature of the heat-absorbing inner heat exchanger 35 from being lowered due to the decrease of the workload of the compressor 31.

When $T_{out}$ > lower-limit $T_{int}$ in the step 407, the program proceeds to a step 408 wherein it is judged whether or not the outlet air temperate $T_{out}$ of the heat-absorbing inner heat exchanger 35 is larger than the upper-limit cooling temperature (upper-limit $T_{int}$) determined in the step 405.

When $T_{out}$ > upper-limit $T_{int}$ in the step 408, the program proceeds to a step 411 wherein the workload of the compressor 31 is increased by $\Delta V_C$ and the outlet air temperature of the heat-absorbing inner heat exchanger 35 is lowered in order to ensure the predetermined dehumidification amount of the conditioned-air. In contrast, when $T_{out}$ < upper-limit $T_{int}$ in the step 408, the program proceeds to the step 409 wherein a deviation $\Delta \theta$ between the target conditioned-air temperature $T_{of}$ and the outlet conditioned-air $T_v$ of the heat-radiating inner heat exchanger 35 is calculated.

When $\Delta \theta > S$ in the step 410, that is, when the outlet air temperature does not reach the target conditioned-air temperature $T_{of}$, the program proceeds to a step 411 wherein the workload of the compressor 31 is increased by $\Delta V_C$ in order to raise the outlet temperature. When $\Delta \theta < -S$ in the step 410, the program proceeds to a step 413 wherein the workload of the compressor 31 is decreased by $\Delta V_C$ in order to lower the outlet air temperature. When $-S \leq \Delta \theta \leq S (|\Delta \theta| \leq S)$, the program proceeds to a step 412 wherein the workload of the compressor 31 is maintained.

With the heating operation by the heat pump type air conditioner according to the present invention, it becomes possible to continuously operate the heating operation without the effect of the ambient temperature. The predetermined changing amount of the workload of the compressor 31 always generates the predetermined change of the outlet air temperature (the change of the radiating heat amount to the compartment) without being effected by the ambient temperature or the running condition of the vehicle. Furthermore, since during the heating operation, dehumidifying operation is always implemented by the heat-absorbing inner heat exchanger 35, it becomes possible that a dehumidifying temperature control is implemented without causing an unstable phenomenon by the compressor control as shown in FIG. 4.

FIG. 5 shows a flow chart for a compressor control under the cooling operation. In a step 501, the cooling operation is started. Following this, in a step 502, it is judged whether the outlet air is blown out from the ventilator outlet or not (Vent. mode ?).

In case that the outlet air is blown out from the ventilator outlet, that is, when the judgment in the step 502 is "YES", it is a most effective way for saving energy that the air fed to the heat-absorbing inner heat exchanger 35 is cooled to a target outlet air temperature and blown out into the passenger compartment. Accordingly, in order to accomplish the above-mentioned operation, the program proceeds to a step 503 wherein the target outlet air temperature $X_M(T_{of})$ is set at the target temperature $T_{int}$ of the heat-absorbing inner heat exchanger 35.

When the outlet air is not blown out from the ventilator outlet, that is, when the judgment in the step 502 is "NO", the program proceeds to a step 504 wherein it is judged whether the air conditioner is operated under a bi-level mode or not. When the bi-level mode is implemented, the program proceeds to a step 506 wherein the correction term $\delta T_C$ is determined at $T_3$ ($\delta T_C = T_3$). When the bi-level mode is not implemented, the program proceeds to a step 505 wherein the correction term $\delta T_C$ is determined at $T_1$ ($\delta T_C = T_1$). The correction term $\delta T_C$ is increasingly changed in accordance with the increase of the reheating amount in the heat-radiating inner heat exchanger 33.

In a step 507, the target air temperature $T_{int}$ of the outlet air from the heat-absorbing inner heat exchanger 35 is set at a larger one of the temperature $T_5$ used in the step 405 and the value which is obtained by correcting the target outlet air temperature $T_{of}$ by the correction term $\delta T_C$ determined in the step 505 or 506.

In a step 508, the difference $\theta$ between the target temperature $T_{int}$ calculated in the step 503 or 507 and the outlet air temperature $T_{out}$ of the heat-absorbing inner heat exchanger 35 is calculated.

In a step 509, when the difference $\theta$ is lower than $-S_0$ ($\theta < -S_0$), the program proceeds to a step 510 wherein the workload of the compressor 31 is increased by $\Delta V_C$ so as to lower the outlet air temperature of the heat-absorbing heat exchanger 35. When the difference $\theta$ is larger than $S_0$ ($\theta > S_0$), it is judged that the workload of the compressor 31 is increased. Accordingly, the program proceeds to a step 512 wherein the workload of the compressor 31 is decreased by $\Delta V_C$. When the difference $\theta$ takes other values, that is, when $-S_0 \leq \theta \leq S_0$, the workload of the compressor 31 is maintained.

With the thus arranged embodiment of the system according to the present invention during heating operation the three-way valve 32 is switched as indicated by a continuous line arrow in FIG. 1, and the refrigerant is circulated as follows: The compressor 31→ the three-way valve 32→ the heat-radiating inner heat exchanger 33→ the receiver 36→ the expansion valve 34→ the heat-absorbing inner heat exchanger 35→ the compressor 31. Accordingly, the air led by the blower fan 37 is heated by the refrigerant passing through the heat-radiating inner heat exchanger 33. Air led by the fan flow 37 is cooled by the refrigerant passing through the heat-absorbing inner heat exchanger 35.

On the other hand, during a cooling operation the three-way valve 32 is switched as indicated by a dashed line arrow in FIG. 1, and the refrigerant in the system is circulated as follows: The compressor 31→ the three-way valve 32→ the outer heat exchanger 38→ the outlet-side switching valve 91→the heat-radiating inner heat exchanger 33→ the receiver 36→the expansion valve 34→ the heat-absorbing inner heat exchanger 35→ the compressor 31. Accordingly, the outer heat exchanger 38 transmits the heat of the refrigerant discharged from the compressor 31 into the atmosphere. Furthermore, the remaining heat of the refrigerant is transmitted to the air led by the blower fan 37 through the heat-radiating inner heat exchanger 33. The heat-absorbing inner heat exchanger 35 transmits the heat of the air led by the fan blower 37 or led by the ram pressure during the vehicle running condition to the refrigerant. Therefore, the air passing through the heat-radiating inner heat exchanger 33 is heated and the air passing through the heat-absorbing inner heat exchanger 35 is cooled.

That is to say, during the heating operation, the amount of the absorbing heat at the heat-absorbing inner heat exchanger 35 and the workload corresponding to the real input value $W_{comp}$ of the compressor 31 are radiated from the heat-radiating inner heat exchanger 33 due to the starting of the compressor 31. Accordingly, air whose temperature is higher than the inlet air temperature $T_{suc}$ of the heat-absorbing inner heat exchanger 35 is fed to the passenger compartment. That is to say, the inlet air temperature $T_{suc}$ is raised with the lapse of a heating operation time, and the real input value $W_{comp}$ of the compressor 31 is increased. Accordingly, the passenger compartment is accelerately heated. Furthermore, since the air passing through the heat-absorbing inner heat exchanger 35 is led to the heat-radiating inner heat exchanger 33, the efficiency of the compressor 31 is justified into optimum in a manner to determine the real input value $W_{comp}$ so as not to generate the freezing in the heat-absorbing inner heat exchanger 35 relative to the heat load of the air passing through the heat-absorbing inner heat exchanger 35.

When the heating operation is implemented by the above-discussed main control, the interruption routine shown by the flow chart in FIG. 6 is implemented at predetermined intervals so as to maintain the inner pressure of the outer heat exchanger 38 at a predetermined value.

In a step 601, the temperature $T_{cond}$ detected by the outer heat exchanger temperature sensor 90 is read by the control unit 43 in order to judge the thermal condition of the outer heat exchanger 38.

In a step 602, it is judged whether the temperature $T_{cond}$ of the outer heat exchanger 38 is lower than a preset temperature $T_{cond,set}$ or not. When the judgment in the step 602 is "YES" ($T_{cond} < T_{cond,set}$), the program proceeds to a step 603. When the judgment in the step 602 is "NO" ($T_{cond} \geq T_{cond,set}$), it is judged that the temperature of the outer heat exchanger 38 is not lowered, and therefore the pressure of the outer heat exchanger 38 is not lowered. Accordingly, the program jumps to end in order to finish the interruption routine.

In the step 603, the opening time of the outlet-side switching valve 91 is determined according to the temperature of the outer heat exchanger 38. More particularly, it is determined what seconds per 30 seconds is the opening time of the outlet-side switching valve 91. For example, when the outer heat exchanger temperature $T_{cond}$ is within the range from 0° C. to 5° C., the opening time is set as 2 seconds per 30 seconds. When the temperature $T_{cond}$ is within the range $-15°$ C. to 0° C., the opening time is in proportion with the temperature $T_{cond}$ with the range from 2 seconds to 8 seconds per 30 seconds. When the temperature $T_{cond}$ is lower than or equal to $-15°$ C., the opening time is set as 8 seconds per 30 seconds.

Following this, the program proceeds to a step 604 wherein the electromagnetic actuator 91a is operated according to the determined opening time in the step 603. After the opening operation for a predetermined time, the interruption routine is finished.

Accordingly, although the refrigerant is not basically flowed from the compressor 31 to the outer heat exchanger 38 during heating operation, in case that the temperature of the outer heat exchanger 38 is lowered and the pressure is thereby lowered, the outlet-side switching valve 91 is opened to flow a part of the refrigerant directing to the heat-radiating inner heat exchanger 33 toward the outer heat exchanger 38 through the outlet-side switching valve 91. In this case, if the lowering of the temperature of the outer heat exchanger 38 is small, the opening time of the outlet-side switching valve 91 is small. Accordingly, it is possible to recover the temperature and pressure of the outer heat exchanger 38 into a predetermined condition without largely reducing the heat radiating amount at the heat-radiating inner heat exchanger 33. Also, when the temperature of the outer heat exchanger 38 is relatively low, the opening time is increased. However, in usual the recovery operation by the outlet-side switching valve 91 is implemented even if the temperature and pressure of the outer heat exchanger 38 are slightly lowered. Accordingly, the large lowering of the temperature and pressure of the outer heat exchanger 38 is usually avoided. Exceptionally, the temperature and pressure of the outer heat exchanger 38 are largely lowered just after the start of the air conditioner. In order to reply to such an exceptional condition, the control of the outlet-side switching valve 91 is implemented as shown in the step 603 in FIG. 6 with regard to the largely low temperature of the outer heat exchanger 38. Therefore, the temperature and pressure of the outer heat exchanger 38 is recovered in some degree, and the stagnation of the refrigerant in the outer heat exchanger 38 due to the lowering of the temperature is not generated. Furthermore, the lack of the refrigerant in the operating refrigerating cycle can be avoided and therefore it becomes possible to implement a stable heating operation.

Although in this embodiment the thermal condition of the outer heat exchanger 38 is judged from the temperature in the outer heat exchanger 38 in the flow chart of FIG. 6, it will be understood that the thermal condition may be judged from the pressure or both the pressure and temperature. Furthermore, it may be judged from the ambient temperature.

Although in this embodiment the opening time of the outlet-side switching valve 91 has been determined, it will be understood that the opening of the outlet-side switch valve 91 may be controlled until the pressure reaches a predetermined pressure upon continuously detecting the pressure of the outer heat exchanger 38.

In a conventional heat pump type air conditioner, when moisture in the atmosphere is attached on the surface of the coil of the outer heat exchanger in the form of frost like as snow during a heating operation, hot and high pressure gas from the compressor is fed to the coil to implement a defrost operation. Such a method is known as a method "hot gas bypass" and is disclosed in the page 134 of the book "Shinpen Reitou Kuuchou Jitsumu Dokuhon (New Edition Refrigeration and Air-conditioning Practical Book)", written by Kenji Ishiwatari and published in 1986 from Ohm Publishing Company. The purpose of this method is to defrost the outer heat exchanger used as a condenser. During the defrost operation, the feeding of the air into a passenger compartment is stopped, and therefore the air-conditioning of the passenger compartment is temporarily stopped.

In contrast, with the heat pump type air conditioner according to the present invention, a part of the refrigerant from the compressor 31 to the heat-radiating inner heat exchanger 33 is merely flowed into the outer heat exchanger 38 through the outlet-side switching valve 91. Accordingly, the feeding of the air by the blower fan 37 is not stopped during the defrost operation, and the refrigerating cycle is efficiently operated. Therefore, it is possible to generate a stable conditioned-air by heat-exchanging in the heat-radiating inner heat exchanger 33.

Figure 7:
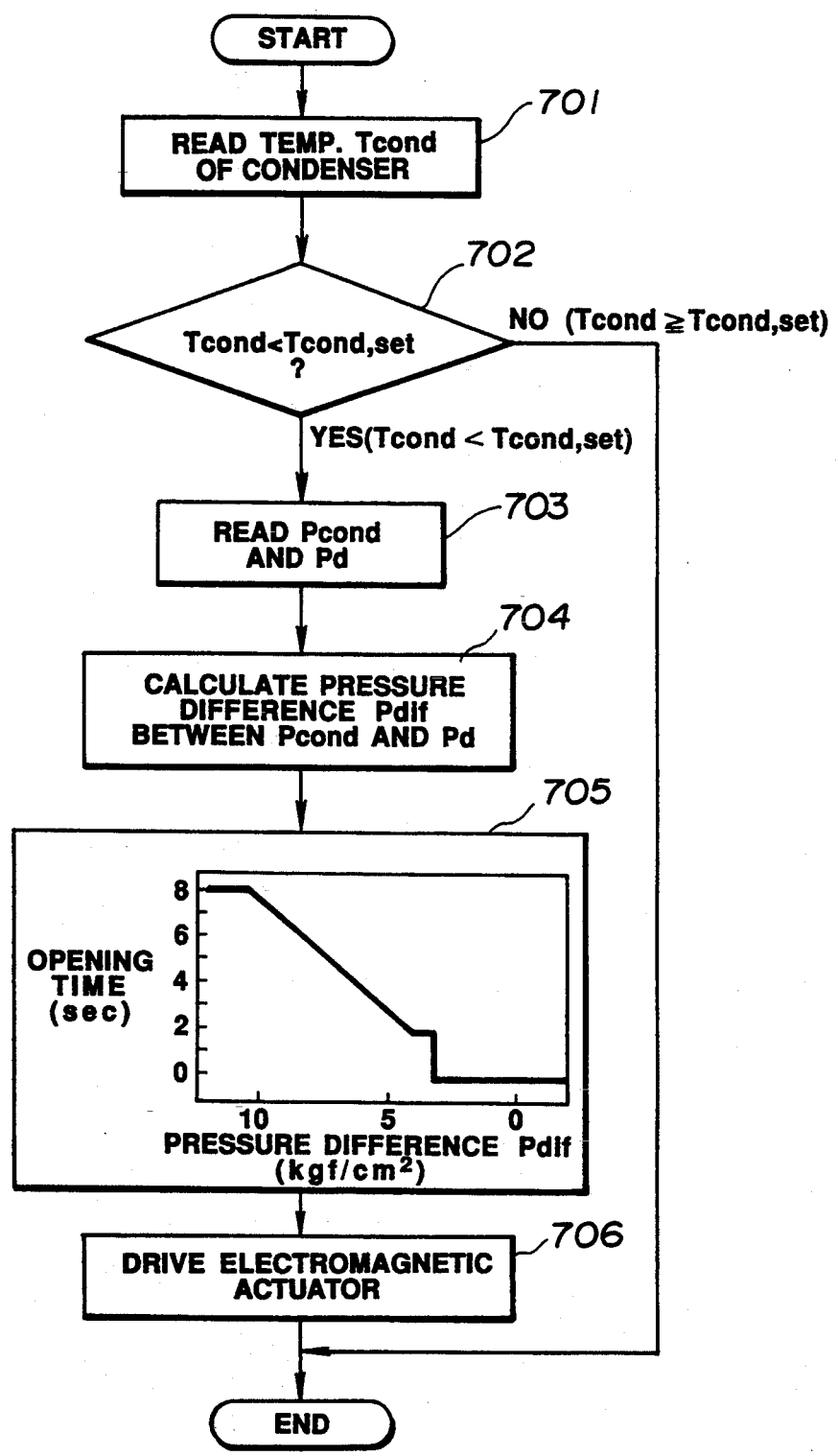
FIG. 7 is another flow chart for interruption routine for determining an opening time of a switch valve in the heat pump type air conditioner of a second embodiment.

FIG. 7 shows a flow chart which is an interruption routine relative to a main control routine in a second embodiment of the heat-pump type air conditioner according to the present invention.

The second embodiment is the same as the first embodiment in structure, but it is further arranged to prevent the system from generating abnormal vibration in the event of the exchanging period from heating operation to cooling operation. That is, if the operation of the air conditioner is changed from heating operation to cooling operation under a condition that the temperature $T_{cond}$ of the outer heat exchanger 38 is lowered and therefore the pressure is lowered, it may happen that the expansion valve 34 generates abnormal vibration due to the pressure difference between the discharge pressure of the compressor 31 and the pressure in the outer heat exchanger 38. Therefore, in the second embodiment, an operation to cancel the pressure difference between the discharge pressure of the compressor 31 and the pressure in the outer heat exchanger 38 is implemented by leading a part of the refrigerant to the outer heat exchanger 38 before the switching from the heating operation to the cooling operation.

When the control unit 43 received a signal indicative of the switching from the heating operation to the cooling operation, the interruption routine shown by a flow chart in FIG. 7 is implemented.

In a step 701, the temperature $T_{cond}$ detected by the outer heat exchanger temperature sensor 90 is read by the control unit 43 in order to judge the thermal condition of the outer heat exchanger 38.

In a step 702, it is judged whether the temperature $T_{cond}$ of the outer heat exchanger 38 is lower than a preset temperature $T_{cond,set}$ or not. When the judgment in the step 702 is "YES" ($T_{cond} < T_{cond,set}$), the program proceeds to a step 703. When the judgment in the step 702 is "NO" ($T_{cond} \geq T_{cond,set}$), it is judged that the temperature of the outer heat exchanger 38 is not lowered and therefore the pressure of the outer heat exchanger 38 is not lowered. Accordingly, the program jumps to end to finish the interruption routine.

In the step 703, the control unit 43 reads the pressure $P_{cond}$ in the outer heat exchanger 38 and the discharge pressure $P_d$ of the compressor 31. Following this, in a step 704 the pressure difference $P_{dif}$ between the pressure $P_{cond}$ in the outer heat exchanger 38 and the discharge pressure $P_d$ of the compressor 31 is calculated from the following equation:

$$P_{dif} = P_d - P_{cond}$$

In a step 705, the opening time of the outlet-side switching valve 91 is determined according to the pressure difference $P_{dif}$. More particularly, it is determined what seconds per 30 seconds should be used as the opening time of the outlet-side switching valve 91. For example, when the pressure difference $P_{dif}$ is lower than 3.5 kgf/cm$^2$, the opening time is set as 0 second. When the pressure difference $P_{dif}$ is within the range from 3.5 to 4.0 kgf/cm$^2$, the opening time is set as 2 seconds per 30 seconds. When the pressure difference $P_{dif}$ is within the range 4.0 to 10 kgf/cm$^2$, the opening time is in proportion with the pressure difference $P_{dif}$ within the range from 2 seconds to 8 seconds per 30 seconds. When the pressure difference $P_{dif}$ is larger than or equal to 10 kgf/cm$^2$, the opening time is set as 8 seconds per 30 seconds.

Following this, the program proceeds to a step 706 wherein the electromagnetic actuator 91a is operated according to the determined opening time in the step 705. After the opening operation for a predetermined time the interruption processing is finished.

Accordingly, in case of the switching from the heating operation to the cooling operation, when the pressure difference $P_{dif}$ between the discharge pressure $P_d$ of the compressor 31 and the pressure $P_{cond}$ of the outer heat exchanger 38 is larger than a predetermined value, the outlet-side switching valve 91 is opened for a predetermined time according to the pressure difference $P_{dif}$ so as to flow a part of the refrigerant into the outer heat exchanger 38 through the outlet-side switching valve 91. Therefore, the pressure in the outer heat exchanger 38 is recovered until it becomes generally equal to the discharge pressure of the compressor 31. Accordingly, a phenomenon such as the abnormal vibration of the expansion valve 36 is avoided even if the operation of the air conditioner is changed from heating to cooling.

Figure 8:
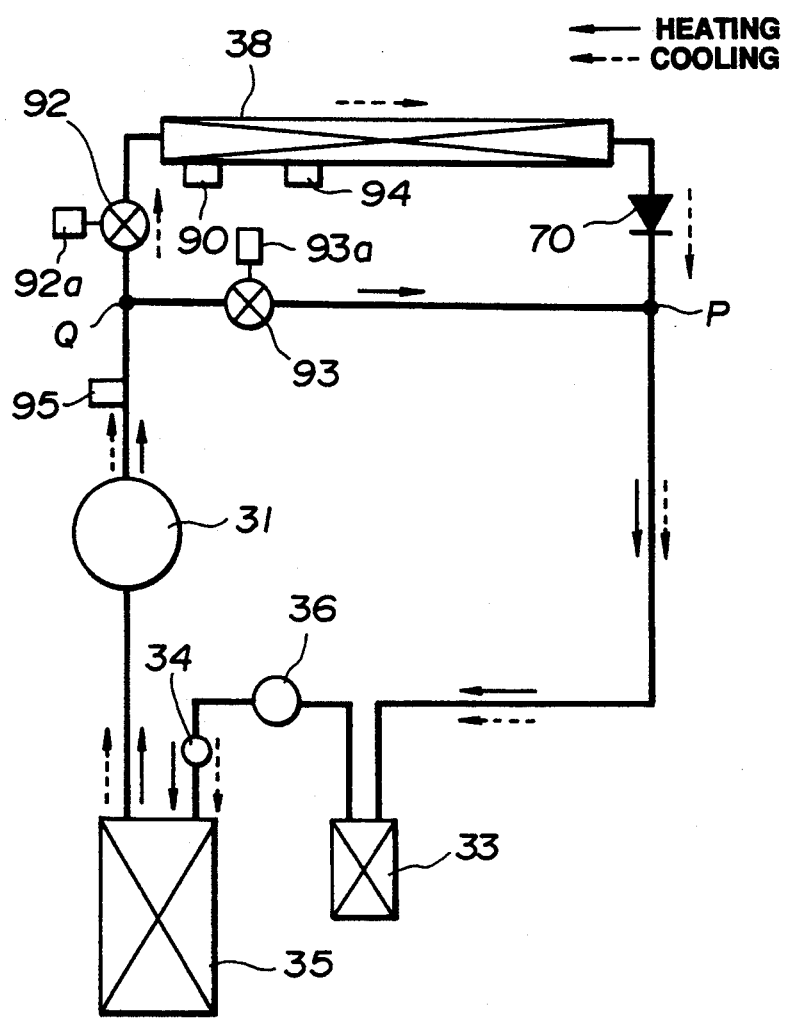
FIG. 8 is a conceptual view for selecting a switching between cooling and heating operations of a third embodiment of the heat pump type air conditioner according to the present invention.

FIG. 8 shows a refrigerating cycle of a third embodiment of the heat pump type air conditioner according to the present invention. The structure of the third embodiment is generally the same as that of the first embodiment except that an inlet-side switching valve 92 and a bypass switching valve 93 are installed instead of the three-way valve 32 and a one-way valve 70 is installed instead of the outlet-side switching valve 92.

In FIG. 8, a first connecting point Q is a branching point at which the discharge side of the compressor 31 branches into the refrigerant inlet of the outer heat exchanger 38 and the inlet side of the heat radiating inner heat exchanger 33. A second connecting point P is a point at which the refrigerant outlet of the outer heat exchanger 38 and the conduit extending from the connecting point Q are connected with the refrigerant inlet of the heat-radiating inner heat exchanger 33. The inlet-side switching valve 92 is disposed between the first connecting point Q and the outer heat exchanger 38, and the bypass switching valve 93 is disposed between the first connecting point Q and the second connecting point P. The switching valves 92 and 93 are provided with electromagnetic actuators 92a and 93a, respectively. The actuators 92a and 93a are operated by the control unit 43. The one-way valve 70 is disposed between the refrigerant outlet of the outer heat exchanger 38 and the second connecting point P. The one-way valve 70 is arranged to allow refrigerant to flow from the outer heat exchanger 38 to the heat-radiating inner heat exchanger 33 and to prevent the refrigerant from flowing from the heat-radiating inner heat exchanger 33 to the outer heat exchanger 38.

A heating operation as shown by dashed line arrows and a cooling operation as shown by continuous line arrows in FIG. 8 are switched by the control of the switching valves 92 and 93. That is, the switching valves 92 and 93 constitute a switching means. Further, since it is possible to feed and stop the refrigerant into the outer heat exchanger 38 during heating operation in a manner to open and close the inlet-side switching valve 92, the inlet-side switching valve 92 functions as a stopping means which is able to feed and stop the refrigerant flow into the outer heat exchanger 38.

With this arrangement, it becomes possible to implement heating and cooling operations and to flow high temperature and high pressure refrigerant into the outer heat exchanger 38 during heating operation. That is, during heat operation, the inlet-side switching valve 92 is closed and the bypass switching valve 93 is opened in order to radiate the heat of the refrigerant from the heat-radiating inner heat exchanger 33. During cooling operation, the inlet-side switching valve 92 is opened and the bypass switching valve 93 is closed in order to radiate the heat of the refrigerant from the outer heat exchanger 38 and the heat-radiating inner heat exchanger 33.

When the temperature and pressure of the outer heat exchanger 38 become low due to the thermal condition, the condenser temperature sensor 90 and the condenser pressure sensor 94 detect the thermal condition. On the basis of the detected result, the inlet-side switching valve 92 is opened for a predetermined time or until the temperature and pressure of the outer heat exchanger 38 reach the preset values.

Accordingly, it is possible to obtain superior functions and effects as same as that in the first embodiment. Since the switching valves 92 and 93 constitute the stopping means, the structure of the system becomes simple.

Figure 9:
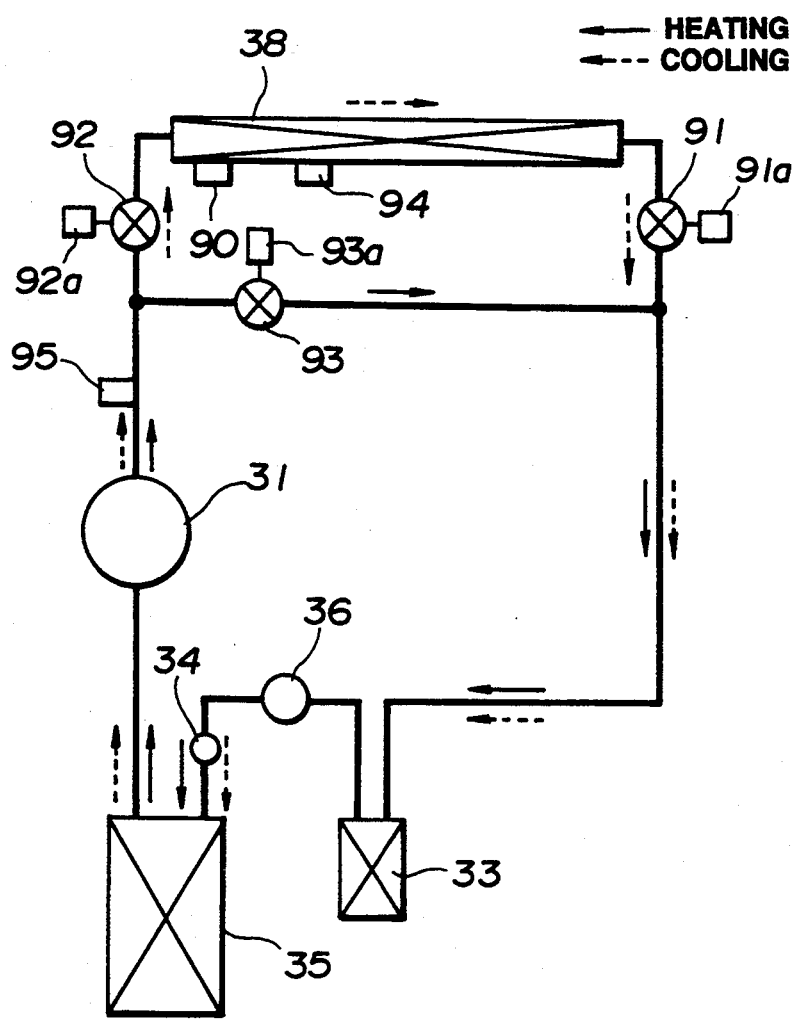
FIG. 9 is a conceptual view for selecting a switching between cooling and heating operations of a fourth embodiment of the heat pump type air conditioner according to the present invention.
Figure 10:
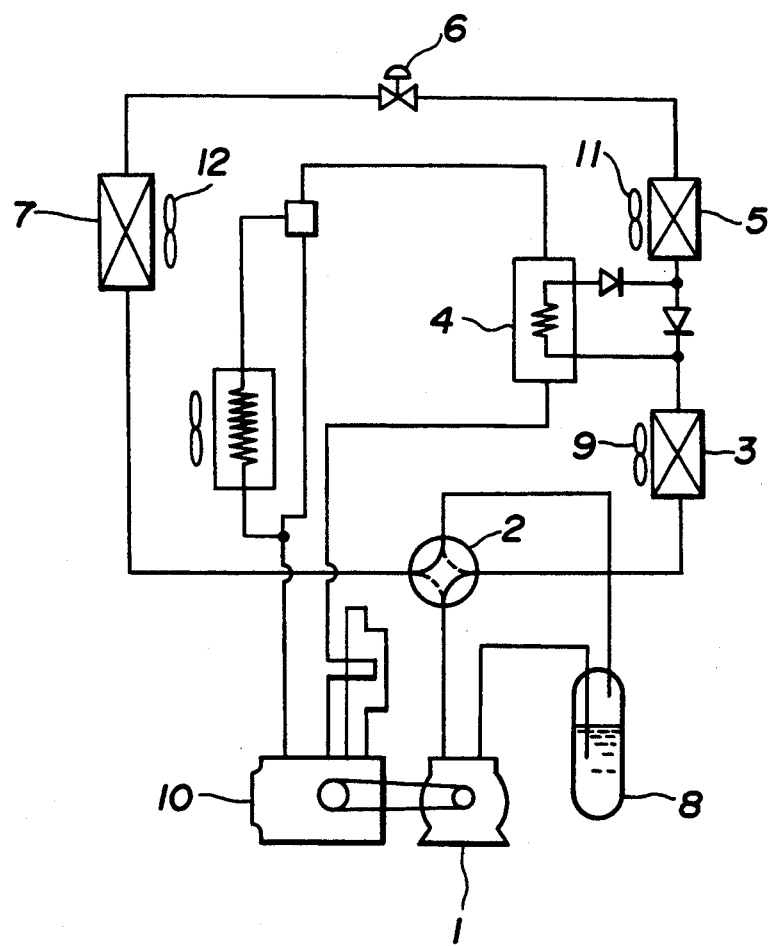
FIG. 10 is a schematic view of a conventional heat-pump type air conditioner.
Figure 11:
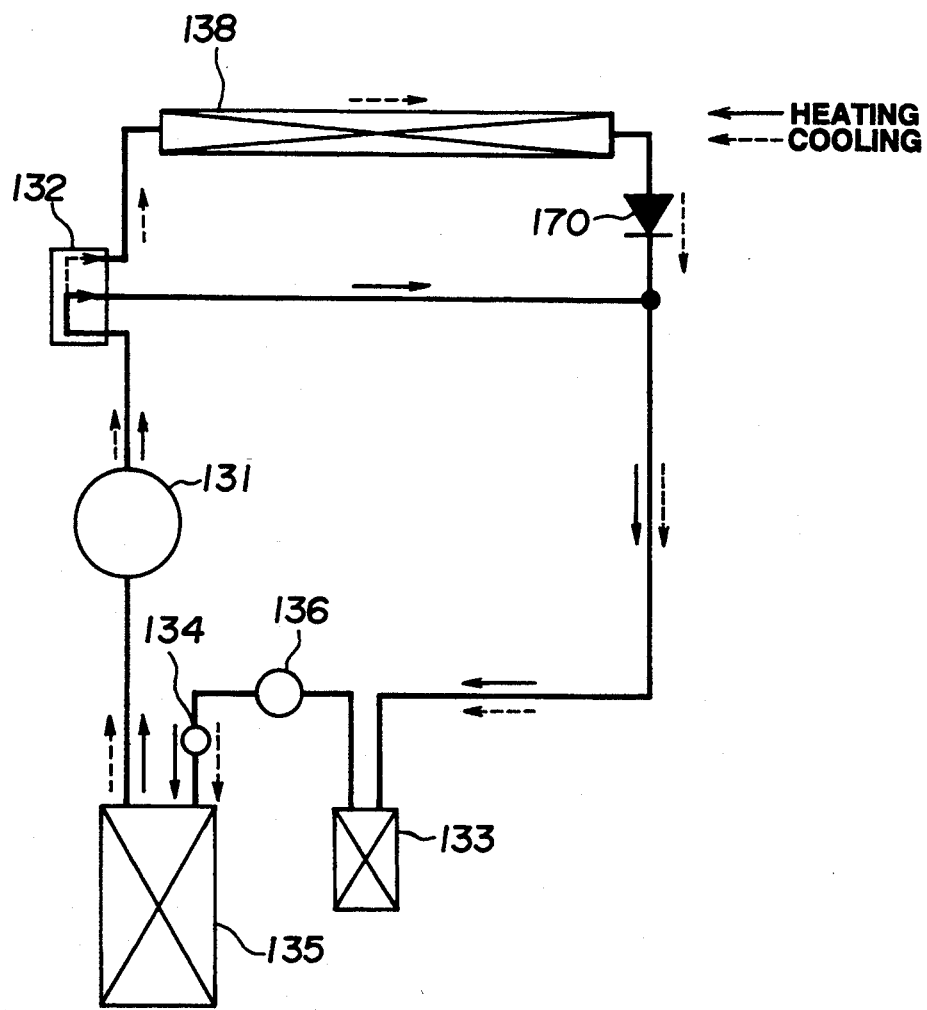
FIG. 11 is a schematic view of another conventional heat-pump type air conditioner.

FIG. 9 shows a refrigerating cycle of a fourth embodiment of the heat pump type air conditioner according to the present invention. The main structure of the fourth embodiment is generally similar to the third embodiment except that an outlet-side switching valve 91 is used instead of the one-way valve 70.

With the thus arranged air conditioner, during a heating operation, by closing the inlet-side switching valve 92 and the outlet-side switching valve 91 and by closing the bypass switching valve 93, the heat radiation is implemented by the heat-radiating inner heat exchanger 33 without using the outer heat exchanger 38. During a cooling operation, the inlet-side switching valve 92 and the outlet-side switching valve 91 are opened, and the bypass switching valve 93 is closed so as to enable the heat radiation to be implemented through the outer heat exchanger 38 and the heat radiating inner heat exchanger 33.

When the temperature and pressure of the outer heat exchanger 38 become low due to the thermal condition, the condenser temperature sensor 90 and the condenser pressure sensor 94 detect the thermal condition. On the basis of the detected result, the inlet-side switching valve 92 or the outlet-side switching valve 91 is opened for a predetermined time or until the pressure and temperature of the outer heat exchanger 38 reach the preset values. Furthermore, it is possible to open both of the inlet-side switching valve 92 and the outlet-side switching valve according to the temperature and pressure of the outer heat exchanger 38. In this case, it is possible to rapidly increase the pressure and temperature of the outer heat exchanger 38 by flowing the refrigerant into the outer heat exchanger 38 through the inlet-side switching valve 92 and the outlet-side switching valve 93, if the pressure of the outer heat exchanger 38 is lower than the discharge pressure of the compressor 31.

What is claimed is:

1. A heat pump type air conditioner for a vehicle, comprising:

refrigerant;

a compressor applying a workload to said refrigerant;

a condenser connected to a refrigerant discharge side of said compressor and radiating heat of said refrigerant into ambient air;

a blower leading air for air-conditioning the passenger compartment of the vehicle;

an inner heat exchanger connected to the refrigerant discharge side of said compressor and transmitting the heat of said refrigerant to the air led by said blower;

an expansion valve connected to a refrigerant outlet side of said inner heat exchanger;

an evaporator connected to a refrigerant outlet side of said expansion valve, said evaporator cooling the air led by said blower by transmitting the heat of the air to said refrigerant which is supplied through said expansion valve from at least one of said condenser and said inner heat exchanger;

a refrigerant passage changing device connecting said compressor with said condenser and said inner heat exchanger, said refrigerant passage changing device being set in one of a cooling operation in that said compressor is fluidly communicated with said condenser and a heating operation in that said compressor is fluidly communicated with said inner heat exchanger; and a switching device connected to at least one of the refrigerant inlet and outlet of said condenser, said switching device controlling the flow of said refrigerant toward said condenser so that, when said refrigerant passage changing device is set in heating operation, said refrigerant is allowed to flow through said condenser.

2. A heat pump type air conditioner for a vehicle, comprising:

refrigerant;

a compressor applying a workload to said refrigerant;

a condenser connected to a refrigerant discharge side of said compressor and radiating heat of said refrigerant into ambient air;

a blower leading air for air-conditioning the passenger compartment of the vehicle;

an inner heat exchanger connected to the refrigerant discharge side of said compressor and transmitting the heat of said refrigerant to the air led by said blower;

an expansion valve connected to a refrigerant outlet side of said inner heat exchanger:

an evaporator connected to a refrigerant outlet side of said expansion valve, said evaporator cooling the air led by said blower by transmitting the heat of the air to said refrigerant which is supplied through said expansion valve from at least one of said condenser and said inner heat exchanger;

a refrigerant passage changing device connecting said compressor with said condenser and said inner heat exchanger, said refrigerant passage changing device being set in one of a cooling operation in that said compressor is fluidly communicated with said condenser and a heating operation in that said compressor is fluidly communicated with said inner heat exchanger; and a switching device connected to at least one of the refrigerant inlet and outlet of said condenser, said switching device controlling the flow of said refrigerant toward said condenser when said refrigerant passage changing device is set in heating operation, said switching device controlling the flow of the refrigerant into said condenser according to thermal information of said condenser during heating operation.

3. A heat pump type air conditioner as claimed in claim 2, wherein said switching device allows the flow of said refrigerant into said condenser until the pressure of said condenser reaches a predetermined pressure.

4. A heat pump type air conditioner as claimed in claim 2, wherein said switching device allows the flow of said refrigerant into said condenser for a predetermined time before the changing from heating operation to cooling operation.

5. A heat pump type air conditioner as claimed in claim 3, wherein said switching device allows the flow of said refrigerant into said condenser for a predetermined time before the changing from heating operation to cooling operation.

6. A heat pump type air conditioner as claimed in claim 2, wherein said switching device allows the flow of said refrigerant into said condenser until the pressure in said condenser becomes a predetermined pressure.

7. A heat pump type air conditioner as claimed in claim 4, wherein said switching device allows the flow of said refrigerant into said condenser until the pressure in said condenser becomes a predetermined pressure.

8. A heat pump type air conditioner as claimed in claim 2, wherein said switching device includes a discharge side switching valve which is connected with the refrigerant outlet of said condenser, the discharge side of said compressor and the inlet side of said inner heat exchanger.

9. A heat pump type air conditioner as claimed in claim 3, wherein said switching device includes a discharge side switching valve which is connected with the refrigerant outlet of said condenser, the discharge side of said compressor and the inlet side of said inner heat exchanger.

10. A heat pump type air conditioner as claimed in claim 4, wherein said switching device includes a discharge side switching valve which is connected with the refrigerant outlet of said condenser, the discharge side of said compressor and the inlet side of said inner heat exchanger.

11. A heat pump type air conditioner as claimed in claim 2, further comprising a plurality of sensors for detecting thermal condition of the vehicle.

12. A heat pump type air conditioner for a vehicle, comprising:

refrigerant;

a compressor applying a workload to said refrigerant;

a condenser connected to a refrigerant discharge side of said compressor and radiating heat of said refrigerant into ambient air;

a blower leading air for air-conditioning the passenger compartment of the vehicle;

an inner heat exchanger connected to the refrigerant discharge side of said compressor and transmitting the heat of said refrigerant to the air led by said blower;

an expansion valve connected to a refrigerant outlet side of said inner heat exchanger;

an evaporator connected to a refrigerant outlet side of said expansion valve, said evaporator cooling the air led by said blower by transmitting the heat of the air to said refrigerant which is supplied through said expansion valve from at least one of said condenser and said inner heat exchanger;

a three-way valve connecting said compressor with said condenser and said inner heat exchanger, said three-way valve being set in one of a first state in that said compressor is fluidly communicated with said condenser and a second state in that said compressor is fluidly communicated with said inner heat exchanger; and a discharge-side switching valve connected to a refrigerant outlet of said condenser, said three-way valve and said inner heat exchanger, said discharge-side switching valve controlling the flow of said refrigerant toward said condenser so that, when said switching device is set in the second state, said refrigerant is allowed to flow through said condenser.

13. A heat pump type air conditioner for a vehicle, comprising:

refrigerant;

a compressor applying a workload to said refrigerant;

a blower leading air for air-conditioning the passenger compartment of the vehicle;

a first valve connected to a discharge side of said compressor, said first valve being opened during heating operation and closed during cooling operation;

a second valve connected at its inlet to the discharge side of said compressor and the inlet of said first valve, said second valve being closed during heating operation and opened during cooling operation;

a condenser connected to an outlet of said second valve and radiating heat of said refrigerant into ambient air;

an inner heat exchanger connected to the refrigerant discharge side of said compressor and transmitting the heat of said refrigerant to the air led by said blower;

an expansion valve connected to a refrigerant outlet side of said inner heat exchanger;

an evaporator connected to a refrigerant outlet side of said expansion valve and an inlet side of said compressor, said evaporator cooling the air led by said blower by transmitting the heat of the air to said refrigerant which is supplied through said expansion valve from at least one of said condenser and said inner heat exchanger;

a one-way valve connected at its inlet to a refrigerant outlet of said condenser, said one-way valve connected at its outlet to the outlet of said first valve and the refrigerant inlet of said inner heat exchanger, said one-way valve stopping refrigerant flow into said condenser therethrough;

wherein said second valve controls the flow of said refrigerant from said compressor toward said condenser during heating operation so that said refrigerant is allowed to flow through said condenser.

14. A heat pump type air conditioner for a vehicle, comprising:

refrigerant;

a compressor applying a workload to said refrigerant;

a blower leading air for air-conditioning the passenger compartment of the vehicle;

a first valve connected to a discharge side of said compressor, said first valve being opened during heating operation and closed during cooling operation;

a second valve connected at its inlet to the discharge side of said compressor and the inlet of said first valve, said second valve being closed during heating operation and opened during cooling operation;

a condenser connected to an outlet of said second valve and radiating heat of said refrigerant into ambient air;

an inner heat exchanger connected to the refrigerant discharge side of said compressor and transmitting the heat of said refrigerant to the air led by said blower;

an expansion valve connected to a refrigerant outlet side of said inner heat exchanger;

an evaporator connected to a refrigerant outlet side of said expansion valve and an inlet side of said compressor, said evaporator cooling the air led by said blower by transmitting the heat of the air to said refrigerant which is supplied through said expansion valve from at least one of said condenser and said inner heat exchanger;

a third valve connected at its inlet to a refrigerant outlet of said condenser, said third valve being connected at its outlet to the outlet of said first valve and the refrigerant inlet of said inner heat exchanger, said third valve being closed during heating operation and opened during cooling operation;

wherein said second and third valves control the flow of said refrigerant from said compressor toward said condenser during heating operation so that said refrigerant is allowed to flow through said condenser.

* * * * *